(12) United States Patent
Wang

(10) Patent No.: US 10,116,491 B1
(45) Date of Patent: Oct. 30, 2018

(54) NETWORK CABLING VERIFICATION

(71) Applicant: Amazon Technologies, Inc., Reno, NV (US)

(72) Inventor: Shuguang Wang, Washington, DC (US)

(73) Assignee: Amazon Technologies, Inc., Seattle, WA (US)

( * ) Notice: Subject to any disclaimer, the term of this patent is extended or adjusted under 35 U.S.C. 154(b) by 339 days.

(21) Appl. No.: 14/288,041

(22) Filed: May 27, 2014

(51) Int. Cl.
*H04L 12/24* (2006.01)
*H04L 12/26* (2006.01)

(52) U.S. Cl.
CPC .............. *H04L 41/06* (2013.01); *H04L 43/06* (2013.01); *H04L 43/16* (2013.01)

(58) Field of Classification Search
CPC .... G01R 29/085; G01R 31/02; G01R 31/021; G01R 31/04; G01R 31/08; G01R 31/043; H04Q 1/20; H04Q 1/24; H04L 12/26; H04L 12/2602; H04L 12/2621
See application file for complete search history.

(56) References Cited

U.S. PATENT DOCUMENTS

| | | | | |
|---|---|---|---|---|
| 6,961,675 | B2* | 11/2005 | David | H04L 12/2602 439/488 |
| 9,172,624 | B1* | 10/2015 | Naik | H04L 43/0811 |
| 9,178,610 | B1* | 11/2015 | Chan | H04B 10/035 |
| 9,450,846 | B1* | 9/2016 | Huang | H04L 43/0858 |
| 9,678,133 | B2* | 6/2017 | Enge | H04Q 1/136 |
| 2004/0160226 | A1* | 8/2004 | Ewing | G01R 31/2808 324/538 |
| 2006/0148279 | A1* | 7/2006 | German | H01R 13/465 439/49 |
| 2007/0010117 | A1* | 1/2007 | Silver | H01R 13/703 439/188 |
| 2007/0237141 | A1* | 10/2007 | Marchese | H04L 41/0853 370/389 |
| 2007/0266384 | A1* | 11/2007 | Labrou | G06F 8/00 718/100 |
| 2007/0280696 | A1* | 12/2007 | Beaver | H04Q 11/0067 398/140 |
| 2008/0034123 | A1* | 2/2008 | Hirao | H04L 41/08 709/253 |
| 2010/0008482 | A1* | 1/2010 | Tucker | H04Q 1/136 379/93.05 |
| 2010/0109892 | A1* | 5/2010 | Fariello | H04Q 1/116 340/653 |
| 2010/0271182 | A1* | 10/2010 | Yashukova | G01R 31/043 340/10.1 |

(Continued)

*Primary Examiner* — Hoang-Chuong Q Vu
(74) *Attorney, Agent, or Firm* — Klarquist Sparkman, LLP (57) ABSTRACT

A cable verification system can be used to verify network connections between a network device and a patch panel. The network device and patch panel can be used to connect customers into a multi-tenant service provider environment through a direct connection. In order to ensure that the customers can properly connect, a cable verification system can be used that determines if the correct connections are made and if the signal levels are sufficiently strong. A backend software service can continuously and automatically check the ports of the networking device for test signals. A web front end can be used by the technician to interface with the backend software service in order to coordinate the testing.

9 Claims, 8 Drawing Sheets

(56) References Cited

U.S. PATENT DOCUMENTS

| | | | | |
|---|---|---|---|---|
| 2010/0302754 A1* | 12/2010 | Nordin | ............... | G02B 6/4452 361/810 |
| 2011/0012712 A1* | 1/2011 | Khozyainov | ........ | G01R 31/043 340/10.1 |
| 2012/0131203 A1* | 5/2012 | Pyatkovskiy | ......... | H04L 12/413 709/227 |
| 2013/0242760 A1* | 9/2013 | Peyton | ................. | H04L 43/50 370/250 |
| 2014/0184238 A1* | 7/2014 | Yossef | .............. | H04L 12/2602 324/538 |
| 2014/0187173 A1* | 7/2014 | Partee | ................. | H04B 17/00 455/67.12 |
| 2014/0280901 A1* | 9/2014 | Balachandran | ....... | H04W 24/04 709/224 |

* cited by examiner

NETWORK CABLING VERIFICATION

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Large installations of data communication equipment (e.g., routers, switches, servers, etc.) are common in service provider, enterprise, or data center environments. The network topology and functionality implemented in such environments are constantly evolving as the installations are adapted to meet ever-changing needs. Regardless of the particulars of such installations, management of the complex infrastructure is a key component of its effectiveness.

Cable management for connection to the service provider can be problematic. A data center environment can house thousands or tens of thousands of server computers requiring an extensive cabling infrastructure. A cabling management program is a desired part of any operations, administration, and maintenance. Efficiency of the cabling management program ideally results in substantial savings in time and resources.

A particular part of cable management is connection between network devices and patch panels, at a front-end of the service provider. Patch panels can provide termination and cross-connection between various fiber optic links, such as between main trunk lines and subscriber lines. Thus, conventional patch panels generally have two corresponding arrays or matrices for receiving and terminating two sets of fiber optic lines, i.e., an incoming set (e.g., main trunk lines) and an outgoing set (e.g., subscriber lines). Currently, setup of cables requires at least two technicians, with one at a patch panel used to connect into the service provider backbone, and a second at a network device checking whether there is proper connection to the patch panel.

Such manual operations where two technicians are communicating with each other at long distances can result in connection errors. Additionally, such a manual operations require an extensive period of time, which increases overall costs.

An improved system and method is needed to connect patch panels to network devices of a service provider.

DETAILED DESCRIPTION

A cable verification system can be used to verify network connections between a network device and a patch panel. The network device and patch panel can be used to connect customers into a multi-tenant service provider environment through a direct connection. In order to ensure that the customers can properly connect, the cable verification system determines if the correct connections are made and if the signal levels are sufficiently strong. One advantage of the system is that only one person (i.e., technician) needs to work on the end where the cables are connected into the patch panel. A backend software service can continuously and automatically check the ports of the networking device for signals. A web front end can be used by the technician to interface with the backend software service. To verify a cable connection is connected to the networking device, the technician opens the web front end (either through a browser or an application) and selects a port on the patch panel from the displayed page to which the connection is being made. The technician then uses a loop back device to connect the other end of the cable to another port. If the cabling is correct, the backend service can detect the signal at the port that was selected on the web page. Once everything matches, the status of the cabling test is recorded to a database and the front end web page is updated with the verification information. If there is any error associated with the cabling, the backend service can alert the technician, either through an email or the front end interface. The technician can be directed which corrective action to take in order to ensure the cabling is correct. Once the cabling is correct, customers can plug into the patch panel to obtain direct access to a multi-tenant service provider without needing an Internet Service Provider (ISP).

Figure 1:
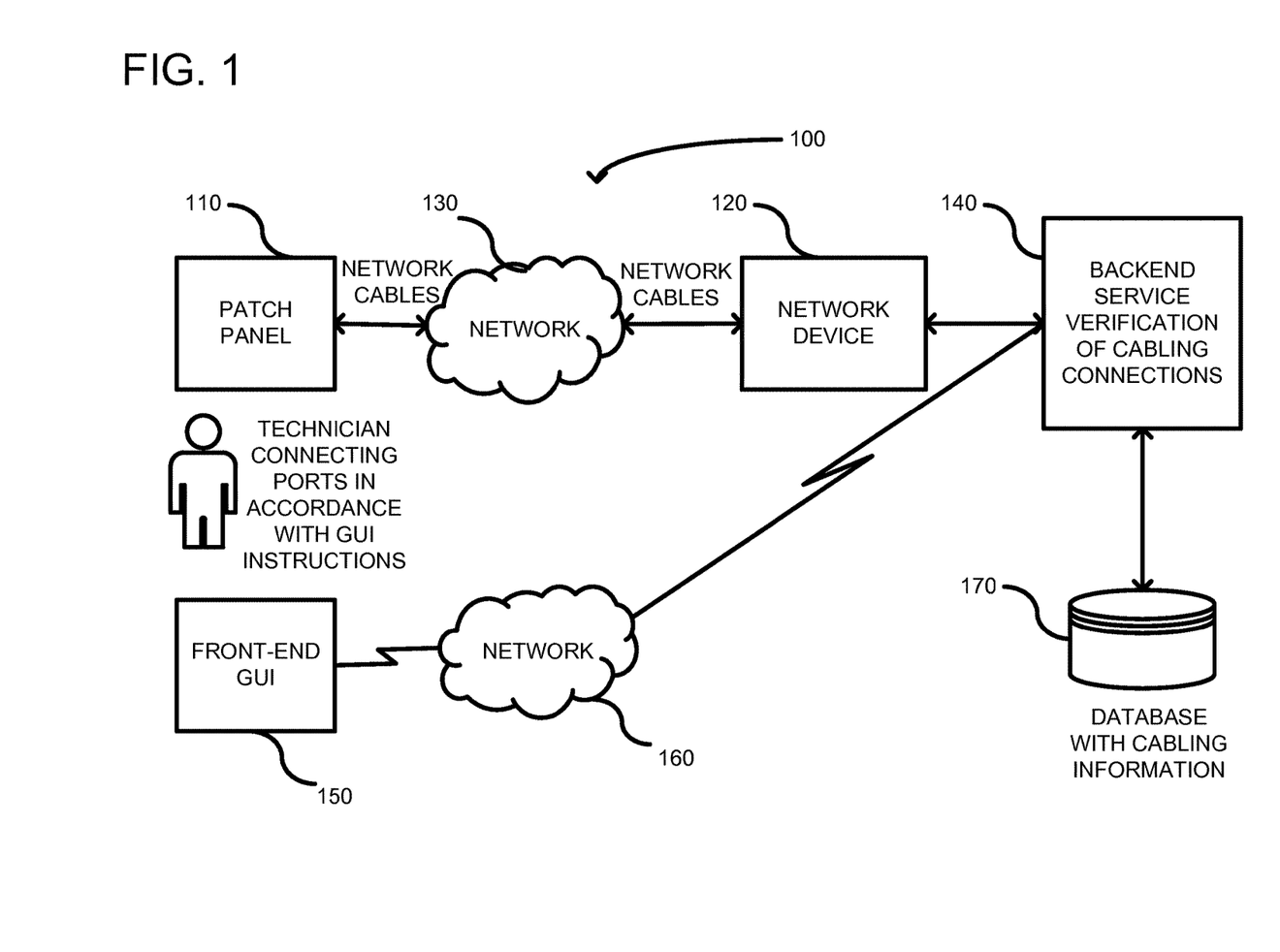
FIG. 1 shows an example of a system that can be used to verify connectivity between a patch panel and a network device.

FIG. 1 shows an example cable verification system 100 used for verifying cabling between a patch panel 110 and a network device 120, such as a router. The network device 120 can either be cabled directly to the patch panel 110 or it can be located a significant distance from the patch panel, in which case it is coupled to the patch panel through a network 130. In any event, there is typically a one-to-one correspondence between ports on the network device and ports on the patch panel. A backend service 140 can be hosted on a server computer or integrated into the network device 120. The backend service 140 can coordinate the verification of the cabling through communication with the network device 120 and a front-end graphical user interface (GUI) 150. The GUI 150 can be viewed by a technician via a network connection 160. The front-end GUI 150 can be viewable on a variety of client devices (e.g., smart phone, laptop, tablet, etc.) and can be accessible via a browser connection or a client application. The front-end need not be a GUI interface and can include other user interfaces, such as command line interfaces, audio interfaces, etc. Once the cabling verification tests are run, the backend service 140 can store results in a database 170. Results can also be posted to the GUI 170 that can direct the technician on further corrective action to take in order to attend to a cabling error or that can direct the technician on next ports to test.

Figure 2:
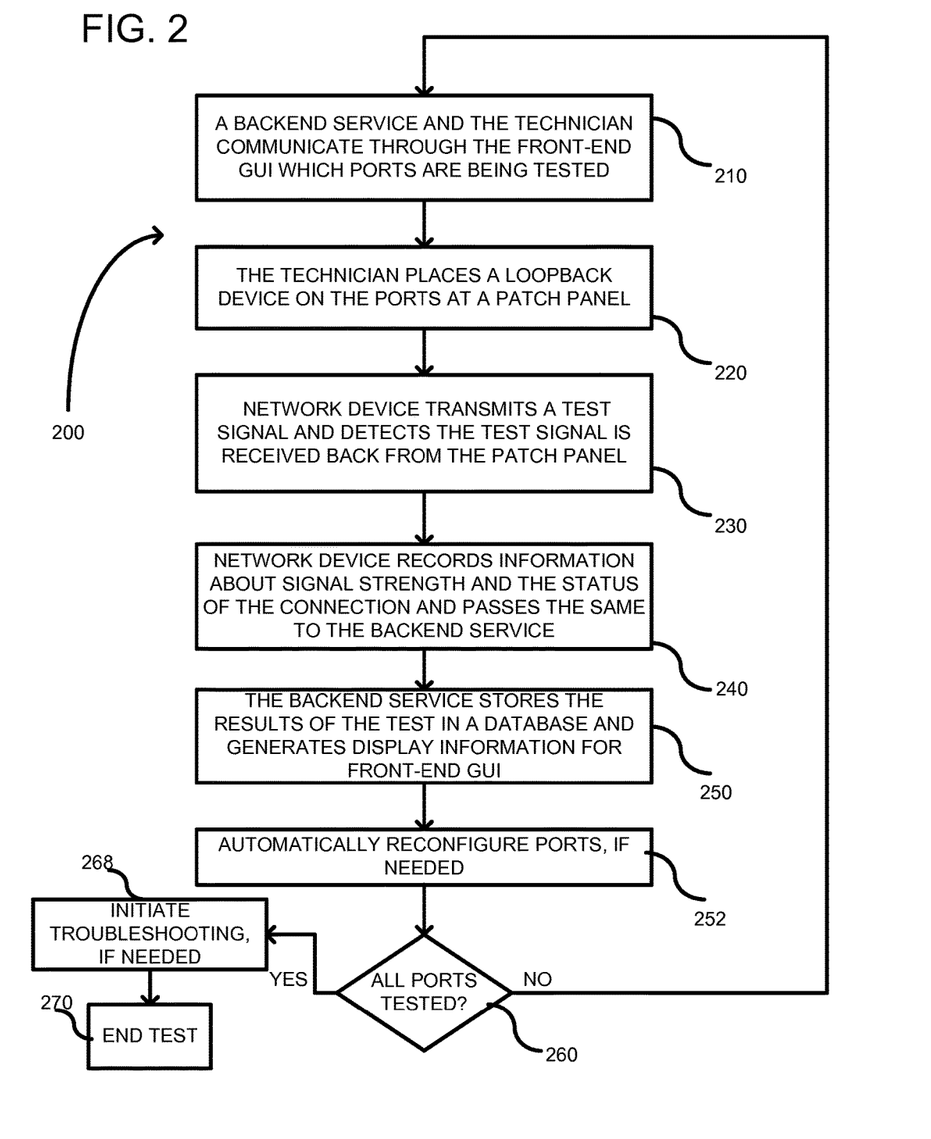
FIG. 2 is an example flowchart of a method for verifying connectivity between the patch panel and the network device.

FIG. 2 is a flowchart 200 of an overall method that can be used with the system of FIG. 1. In process block 210, the backend service 140 and the technician communicate through the front-end GUI 150 about which ports are being tested. The communication can occur in a number of different ways. For example, the backend service can drive the tests telling the technician which ports to test next. Alternatively, the technician can drive the tests telling the backend service what ports are being tested next. In process block 220, the technician places a loopback device on the ports of the patch panel. The loopback device can be a simple cable connectable to each port so as to couple the ports together. Alternatively, the loopback can be a single port loopback device that delays any input signal and retransmits the signal back on the same port on which it was received. Other forms of loopback devices can be used, such as devices that test two or more ports at the same time. In process block 230, the network device 120 transmits a test signal on the port or ports being tested in accordance with the communication between the backend service 140 and the technician. Such a transmission can be initiated using a variety of techniques. For example, the backend service 140 can direct the network device which ports to test. Alternatively, the network device can be configured to automatically and continuously transmit signals on ports and detect and store received signals. The test signal can be any of a variety of forms. For example, the test signal can be a packet transmission having a header and data portion. Alternatively, the test signal can be a single bit of data. Other test signals can be used depending on the particular design. The network device 120 then transmits the test signal. In process block 240, the network device records information about the test signal in return after it reaches the patch panel and loops back to the network device. The test signal is the same signal that was transmitted to the patch panel and looped back using the loopback device. The network device can record information about the signal strength and status of the connection. In process block 250, the backend service stores the results of the test in a database and generates display information for the front-end GUI 170. For example, the results can indicate that the ports are now available for customer use. Alternatively, the backend service can direct the technician what corrective action needs to be taken. The backend service can either collect information from the network device or such information can be passed to the backend service automatically. In process block 252, for certain situations a miscabling can be automatically corrected through reconfiguration of the port assignments. Thus, if the backend service detects that a signal was detected on Port 3, but was expected on Port 2, it can reconfigure the ports so that the cabling is corrected and need not be re-cabled. In decision block 260, a check is made whether all of the ports have been tested. If not, the procedure loops back to process block 210 and begins again to test the next ports. Alternatively, in process block 269, troubleshooting can be initiated by the backend service. For example, if the backend service detects errors, it can generate an error report or guide a technician through any troubleshooting that needs to be performed. In process block 270, the test ends once any troubleshooting is completed.

Figure 3:
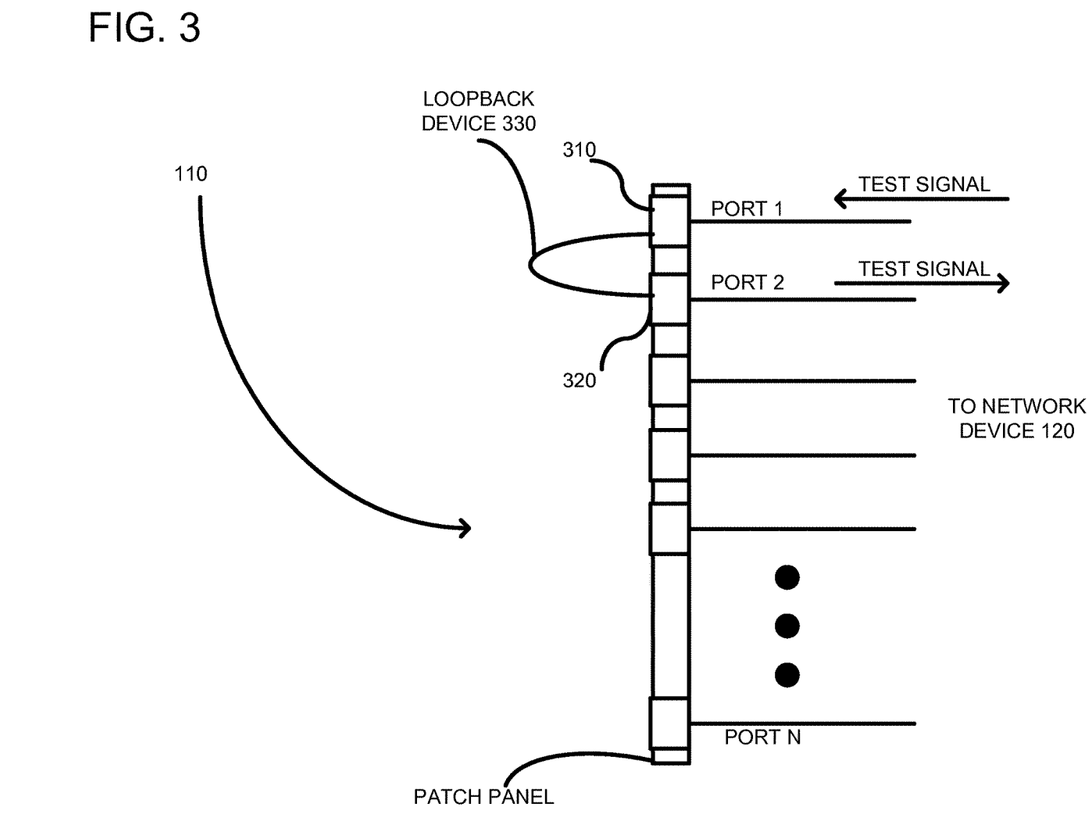
FIG. 3 is an example of a patch panel that can be used in FIG. 1.

FIG. 3 is an example of a patch panel 110 according to one embodiment. Other patch panel configurations can be used. In this embodiment, the patch panel includes N ports (where N is any integer number). Port 1 and Port 2 are shown at 310 and 320, respectively. A test signal is shown incoming on Port 1 and exits on Port 2 due to a loopback device 330, which can be a simple jumper cable with connectors on both ends adapted to couple to the ports in order to establish electrical connectivity there between. In this way, the network device 120 can transmit and receive a test signal from the patch panel. Other patch panel configurations can be used.

Figure 4:
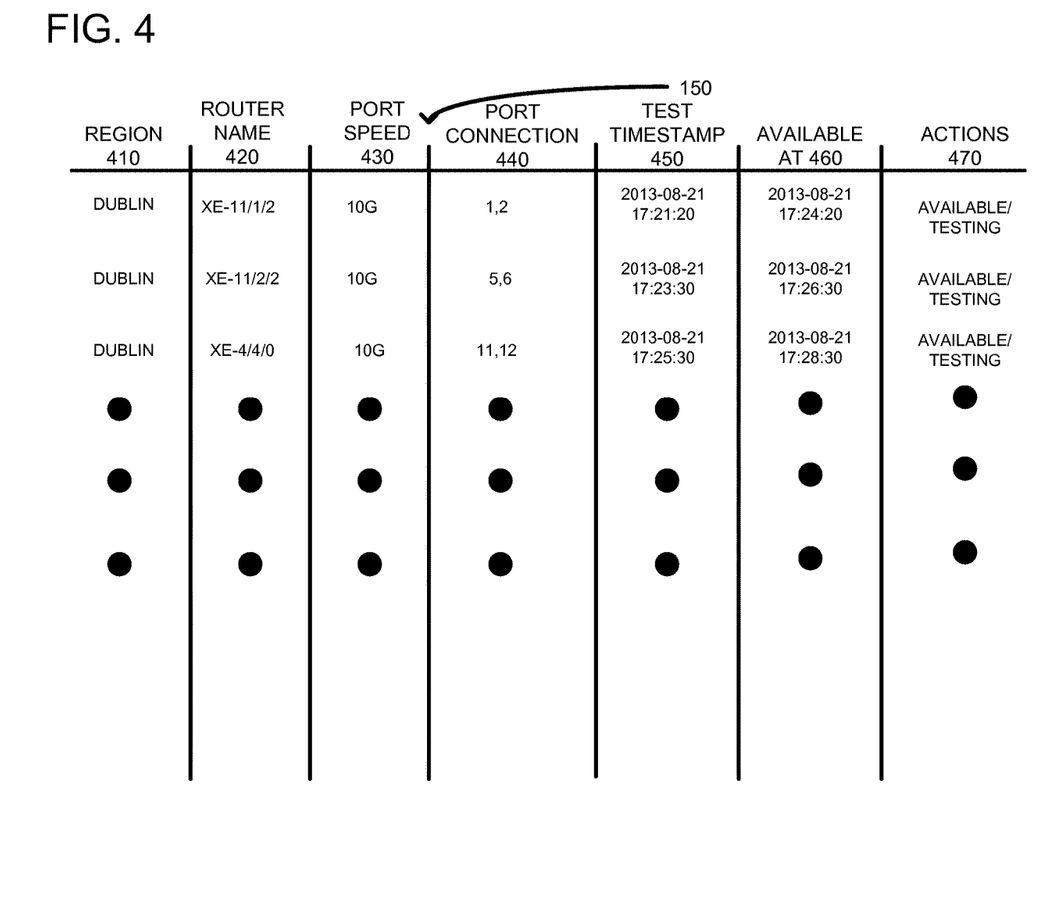
FIG. 4 is an example graphical user interface or database structure that can be used to display/store test results associated with the verification of connectivity.

FIG. 4 shows an example of the front-end GUI 150 that can be used. Additionally, fields associated with displayed data can be stored in the database 170 as test results. The fields are merely exemplary and additional fields can be added or some of the fields can be removed. Field 410 is a geographic region field associated with a location of the patch panel. In this case, it shows Dublin as the city in which the patch panel is located. In field 420, a router identifier is used to indicate a router coupled to the patch panel. The field 420 can include any networking devices. In field 430, a port speed is identified. In field 440, port connection pairs are indicated, such as ports 1 and 2, so that a technician can use a loopback device to couple these ports together during testing. In field 450, a test time stamp is displayed showing when a test was executed. In field 460, a time is displayed indicating when the ports became available to customers. In field 470, actions can be displayed, such as whether the ports are available for customers or being tested.

Figure 5:
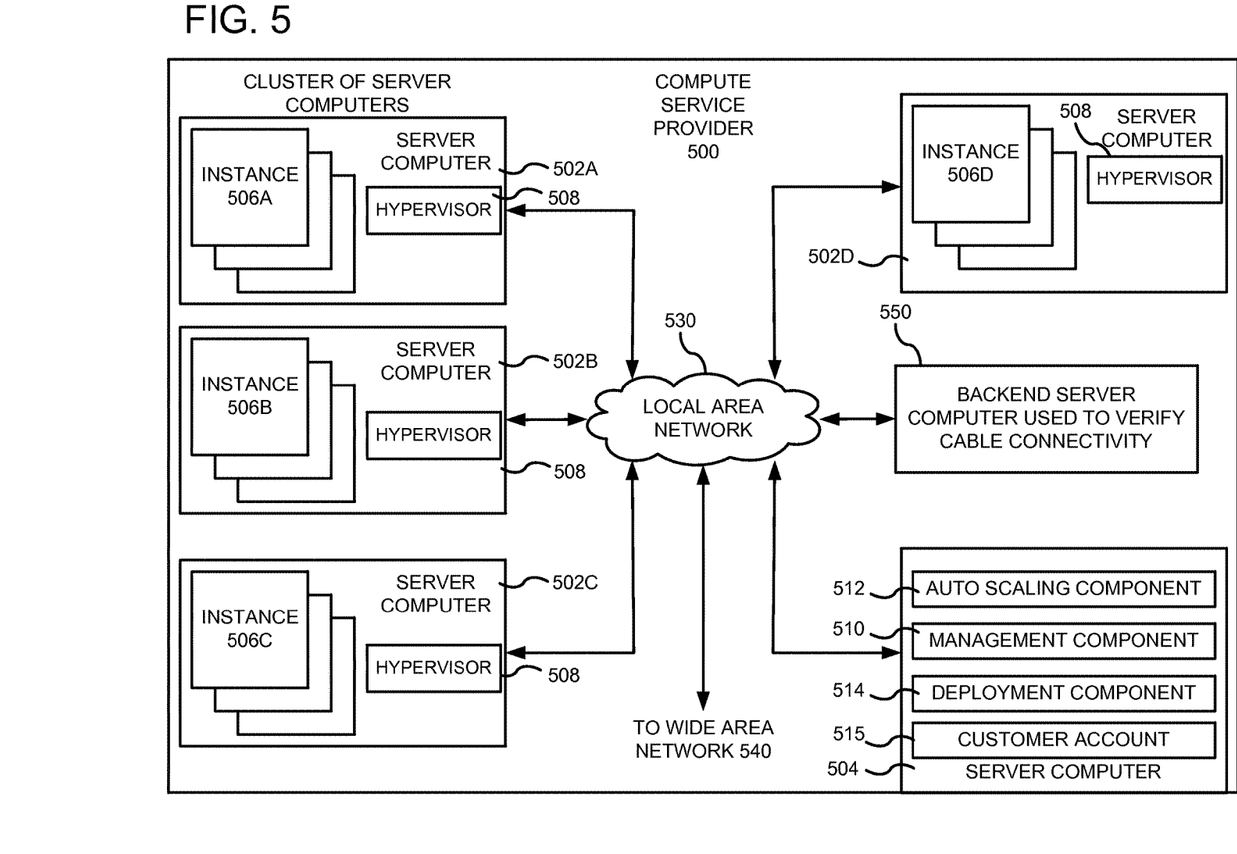
FIG. 5 is an example system diagram showing a plurality of virtual machine instances running in the multi-tenant environment.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-

506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 530 can be utilized to interconnect the server computers 502A-502D and the server computer 504. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and networking devices can be utilized to interconnect the various computing systems disclosed herein.

The backend server 550 can be used to run the backend service 140 of FIG. 1. The backend server 550 is part of the multi-tenant compute service provider. Through the patch panel, tenants can directly connect into the compute service provider 500 without using a separate Internet Service Provider. The network device 120 can also be part of the multi-tenant environment.

Figure 6:
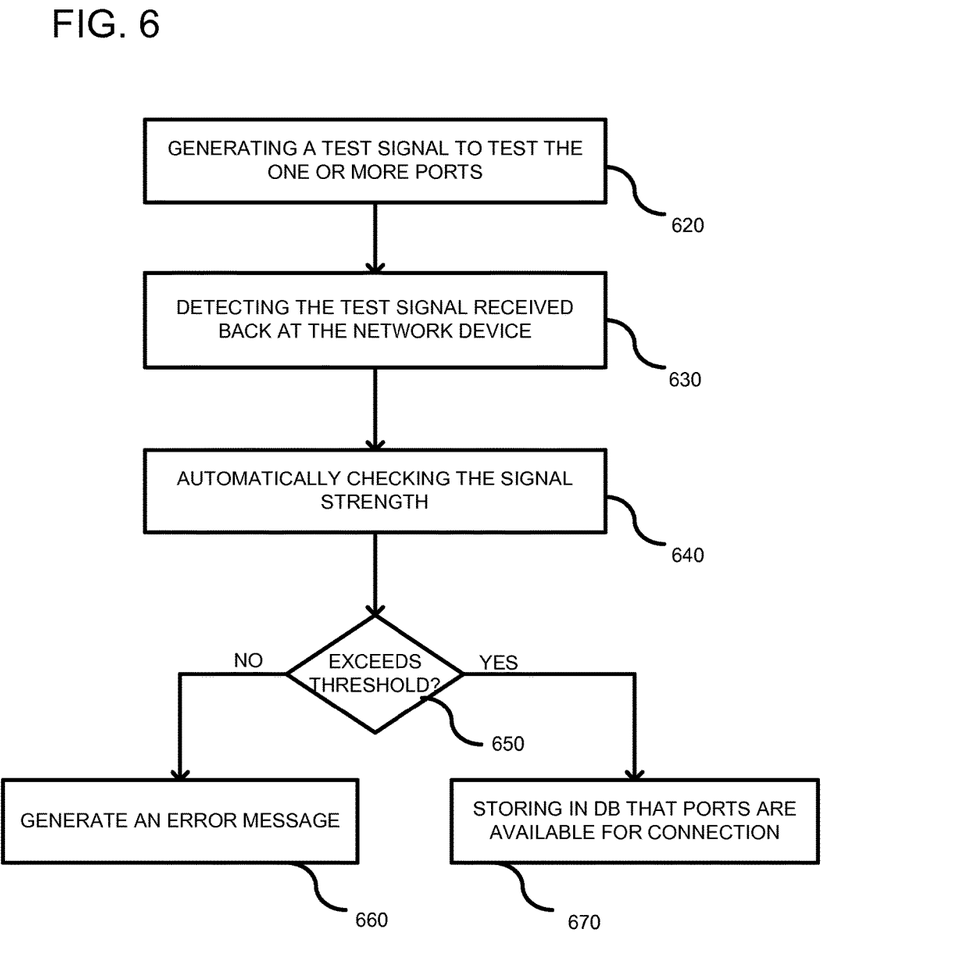
FIG. 6 is a flowchart of a method according to another embodiment for verifying cabling connecting a patch panel to a network device.

FIG. 6 is an exemplary flowchart of a method for verifying cabling of a patch panel and a network device. In process block 620, a test signal can be generated to test the one or more ports. For example, the network device can transmit a signal on a port, such as Port 1. In process block 630, a test signal can be detected on the same port or another port of the network device. Thus, for example, the network device can receive the test signal on Port 2 due to a loopback device connecting Ports 1 and 2, as illustrated in FIG. 3. In process block 640, a test can be made to automatic check the signal strength. For example, the network device can check whether a voltage level of the received signal exceeds a predetermined threshold. Alternatively, the network device can collect the received signal and pass it to the backend service for analysis, such as whether the voltage level exceeds the threshold. In decision block 650, if the threshold is exceeded, then the current ports being tested passed the test and the database can be immediately updated to indicate that the ports are available for connection (process block 670). The updating of the database can be performed by the backend service. Otherwise, in process block 660, an error message can be displayed on the front-end GUI directing the technician the necessary steps to take to correct the error. In any event, after the current ports have been completed, the backend service can generate for display the next ports to be tested.

It should be recognized that the backend service can transmit, to the GUI, an indication of the one or more ports to be connected. The indication can include a port identifier, such as a number identifier associated with each port. When the backend service receives back the test signal, it can match the port identifier transmitted to the GUI against a port identifier on the network device that detects the test signal. If the port identifiers match, then the test was successful.

Figure 7:
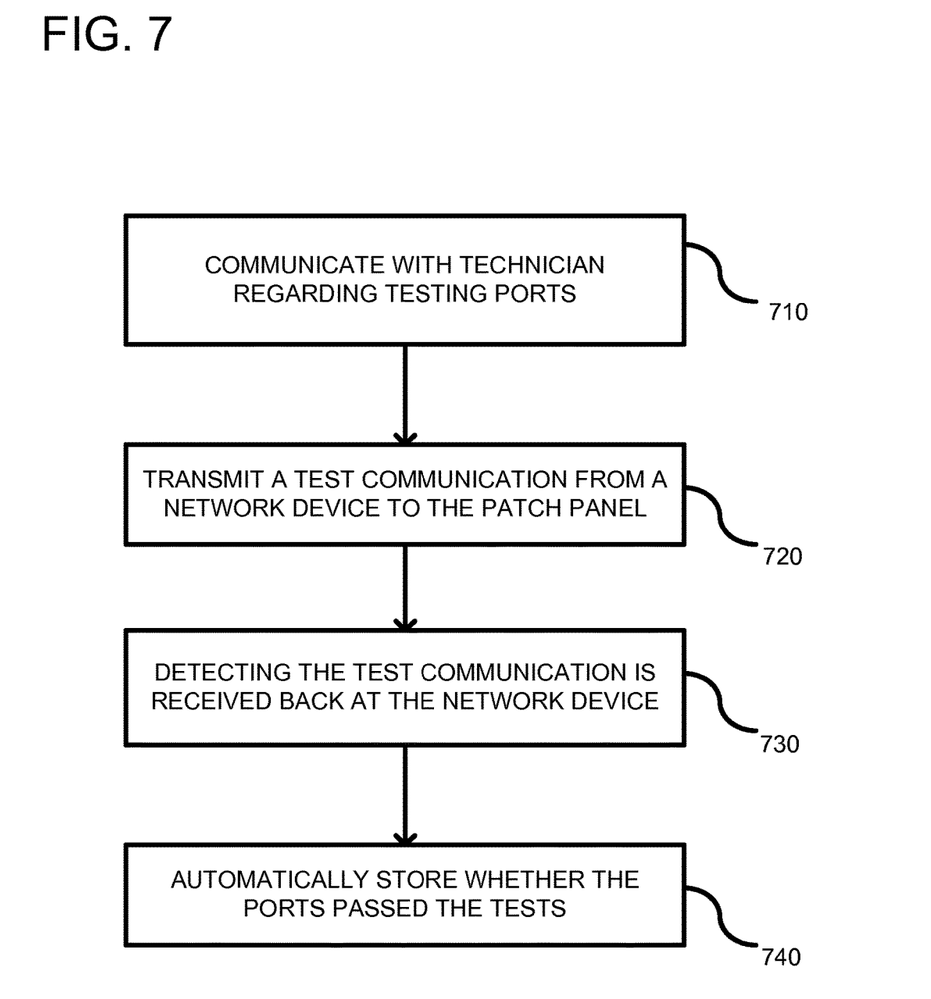
FIG. 7 is a flowchart of a method according to another embodiment for verifying cabling connecting a patch panel to a network device.

FIG. 7 is a flowchart of a method according to another embodiment for verifying cabling of the patch panel and a network device. In process block 710, communication is made with a technician regarding testing of patch panel ports. For example, the communication can be from the backend service to the front-end GUI and vice versa. The backend service can direct the technician which ports to test or the technician can inform the backend service which ports are ready to be tested next. In another example, the communication can include displaying a GUI allowing the technician to select one or more ports being tested. In process block 720, a test communication can be transmitted from the network device to the patch panel. The test communication can be a signal of a variety of types and can be a digital packet transmission, for example. In process block 730, the test communication can be detected as being received back on the network device. A determination can be made regarding how long the transmission took to be sent to the patch panel and be received back. Such a determination can be made by the backend service or the network device. A further check can be made whether the signal strength exceeds a predetermined threshold level, such as a voltage level. In process block 740, the results of the tests can be automatically stored in a database by the backend service. The backend service can further update the front-end GUI providing information that the ports are available for customers to use. Alternatively, if the ports failed, the backend service can provide a procedure (for display on the GUI) instructing the technician how to take corrective action in response to not detecting the test communication back from the patch panel within a predetermined time period.

In some embodiments, if a detection is made that the cables are incorrectly coupled to the wrong ports, the backend service can automatically reconfigure the ports on the network device so that the cabling is considered correct. The cabling as detected can then be stored as the correct cabling.

Figure 8:
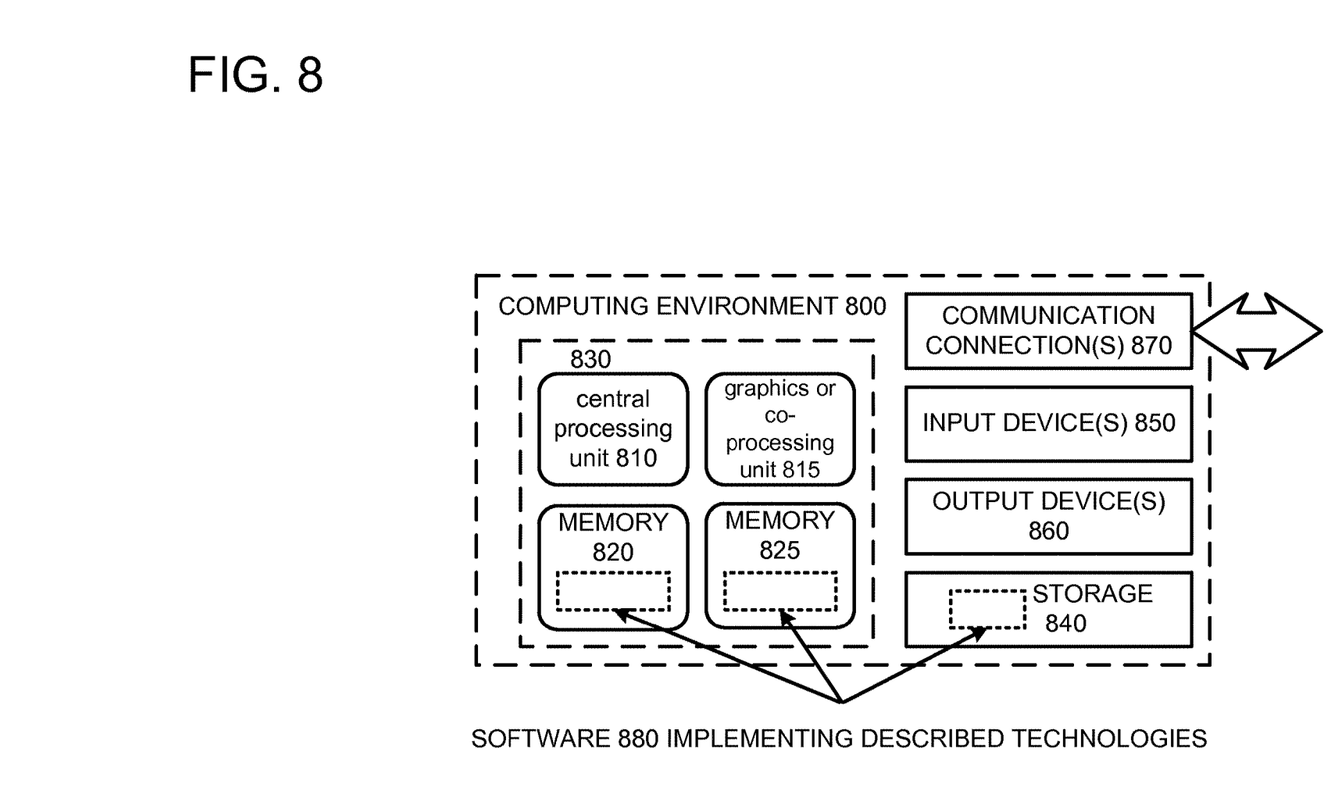
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.). The computing environment can be used for the front-end client device or backend server.

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A computer-readable storage device including instructions thereon for verifying connectivity between a patch panel and a network device, the computer-readable storage device comprising:
    instructions for communicating with a technician regarding testing two or more ports on the patch panel, wherein the two or more ports are coupled together using a loopback device wherein the loopback device is a removable jumper cable;
    instructions for transmitting a test communication from a network device to the patch panel to test the two or more ports;
    instructions for detecting, at the network device, the test communication back from the patch panel on the two or more ports after passing through the loopback device in order to verify connectivity between the patch panel and the network device, the network device for automatically measuring how long the test communication took to be received back at the network device and for automatically measuring a signal strength associated with the test communication received back from the patch panel and for automatically reconfiguring the two or more ports based on the signal strength; and
    instructions for automatically storing whether the two or more ports passed the testing.

2. The computer-readable storage device of claim 1, further including instructions for displaying a graphical user interface directing the technician testing the two or more ports being tested.

3. The computer-readable storage device of claim 1, wherein the instructions for transmitting the test communication include instructions for transmitting the test communication on a first port of the network device and wherein instructions for detecting include instructions for receiving the test communication on a second port of the network device.

4. The computer-readable storage device of claim 1, further including instructions for generating a procedure for display in a graphical user interface instructing the technician on how to take corrective action in response to not detecting the test communication back from the patch panel within a predetermined time period.

5. The computer-readable storage device of claim 1, further including instructions for displaying on a graphical user interface that the two or more ports are available to customers.

6. The computer-readable storage device of claim 1, wherein instructions for automatically storing include storing a location of the patch panel and an identification of the network device.

7. The computer-readable storage device of claim 1, wherein the network device is a network router and wherein the instructions for automatically storing are performed by a server computer coupled to the network device.

8. The computer-readable storage device of claim 7, wherein the instructions for communicating with a technician regarding testing two or more ports on the patch panel include instructions for generating a web page displayable on a remote computing device.

9. The computer-readable storage device of claim 1, further including instructions for automatically reconfiguring the two or more ports on the network device based on the detection of the test communication from the patch panel.

* * * * *